(12) United States Patent
Das et al.

(10) Patent No.: US 10,193,698 B1
(45) Date of Patent: Jan. 29, 2019

(54) AVOIDING INTERDICTED CERTIFICATE CACHE POISONING FOR SECURE SOCKETS LAYER FORWARD PROXY

(71) Applicant: Juniper Networks, Inc., Sunnyvale, CA (US)

(72) Inventors: Premenjit Das, Bangalore (IN); Rajeev Chaubey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 252 days.

(21) Appl. No.: 14/751,332

(22) Filed: Jun. 26, 2015

(51) Int. Cl.
*H04L 9/32* (2006.01)
*H04L 29/06* (2006.01)

(52) U.S. Cl.
CPC .......... *H04L 9/3265* (2013.01); *H04L 9/3236* (2013.01); *H04L 9/3268* (2013.01); *H04L 63/0823* (2013.01); *H04L 63/20* (2013.01)

(58) Field of Classification Search
CPC . H04L 9/3236; H04L 9/3268; H04L 63/0823; H04L 63/20; H04L 63/1483
See application file for complete search history.

(56) References Cited

U.S. PATENT DOCUMENTS

| 6,978,367 | B1 * | 12/2005 | Hind ..................... G06F 21/577 380/273 |
| 7,290,133 | B1 * | 10/2007 | Montgomery ........ H04L 9/3263 713/156 |
| 7,536,544 | B2 * | 5/2009 | Xiao ....................... G06F 21/33 713/155 |
| 7,739,744 | B2 | 6/2010 | Burch et al. |
| 8,032,742 | B2 | 10/2011 | Bergerson et al. |
| 8,438,618 | B2 * | 5/2013 | Eldar ................... H04L 41/0869 713/155 |
| 8,549,300 | B1 * | 10/2013 | Kumar .................. H04L 9/3247 713/153 |

(Continued)

OTHER PUBLICATIONS

Komar et al. "Troubleshooting Certificate Status and Revocation", Microsoft Corporation Nov. 1, 2003 (Year: 2003), 53 pages.*

(Continued)

*Primary Examiner* — Jason K Gee
*Assistant Examiner* — Shu C Gao
(74) *Attorney, Agent, or Firm* — Harrity & Harrity, LLP

(57) ABSTRACT

A device may receive a message, associated with establishing a secure session, including a first certificate chain associated with a server device. The device may generate a first certificate fingerprint associated with the first certificate chain and determine a policy identifier associated with a security policy on which the first certificate chain is to be validated. The device may identify a second certificate fingerprint associated with a second certificate chain that has been validated based on the security policy. The device may determine whether the first certificate fingerprint matches the second certificate fingerprint. The device may provide a stored interdicted certificate chain, associated with the second certificate chain, based on determining that the first certificate fingerprint matches the second certificate fingerprint, or provide a generated interdicted certificate chain, associated with the first certificate chain, based on determining that the first certificate fingerprint does not match the second certificate fingerprint.

18 Claims, 11 Drawing Sheets

(56) References Cited

U.S. PATENT DOCUMENTS

| | | | |
|---|---|---|---|
| 8,615,795 B2* | 12/2013 | Cottrell | H04L 63/0421 726/12 |
| 8,869,259 B1 | 10/2014 | Udupa et al. | |
| 8,996,873 B1 | 3/2015 | Pahl et al. | |
| 9,338,147 B1 | 5/2016 | Rothstein et al. | |
| 9,397,839 B2* | 7/2016 | Thoniel | H04L 9/083 |
| 9,462,006 B2* | 10/2016 | Uzun | H04L 63/123 |
| 9,774,452 B2* | 9/2017 | Bjarnason | H04L 9/3213 |
| 2003/0074584 A1 | 4/2003 | Ellis | |
| 2005/0278534 A1* | 12/2005 | Nadalin | H04L 9/3263 713/175 |
| 2006/0095388 A1* | 5/2006 | Brown | G06Q 20/0855 705/67 |
| 2012/0005746 A1 | 1/2012 | Wei | |
| 2012/0166806 A1 | 6/2012 | Zhang | |
| 2012/0226900 A1 | 9/2012 | Rodgers et al. | |
| 2012/0246475 A1 | 9/2012 | Yoo et al. | |
| 2013/0198511 A1 | 8/2013 | Yoo | |
| 2013/0318343 A1* | 11/2013 | Bjarnason | H04L 41/0809 713/157 |
| 2014/0040637 A1 | 2/2014 | Hameed et al. | |
| 2014/0304499 A1* | 10/2014 | Gopinath | H04L 63/168 713/151 |
| 2015/0067338 A1 | 3/2015 | Gero | |
| 2015/0172064 A1* | 6/2015 | Takenaka | H04L 9/3268 713/156 |
| 2016/0119318 A1 | 4/2016 | Zollinger et al. | |
| 2016/0119374 A1 | 4/2016 | Williams et al. | |
| 2016/0226827 A1 | 8/2016 | Bohannon | |
| 2017/0048714 A1* | 2/2017 | Attfield | G06F 21/44 |

OTHER PUBLICATIONS

Palo Alto Networks, "Decryption," Pan-OS Administrator's Guide Version 6.1, May 13, 2015, 30 pages.

Wikipedia, "Server Name Indication," http://en.wikipedia.org/wiki/Server_Name_Indication, May 15, 2015, 7 pages.

Blue Coat, "Technology Primer: Secure Sockets Layer (SSL)", Blue Coat Systems, Inc., 2008, 22 pages.

Wikipedia, "Forward secrecy," http://en.wikipedia.org/wiki/Forward_secrecy, May 9, 2015, 4 pages.

Scott Helme, "Perfect Forward Secrecy—An Introduction", https://scotthelme.co.uk/perfect-forward-secrecy/, May 10, 2014, 7 pages.

Nbilly, https://live.paloaltonetworks.com/t5/learning-articles/differences-between-SSL-forward-proxy-and-inbound-inspection/ta-p/55553, Oct. 16, 2013, 3 pages.

\* cited by examiner

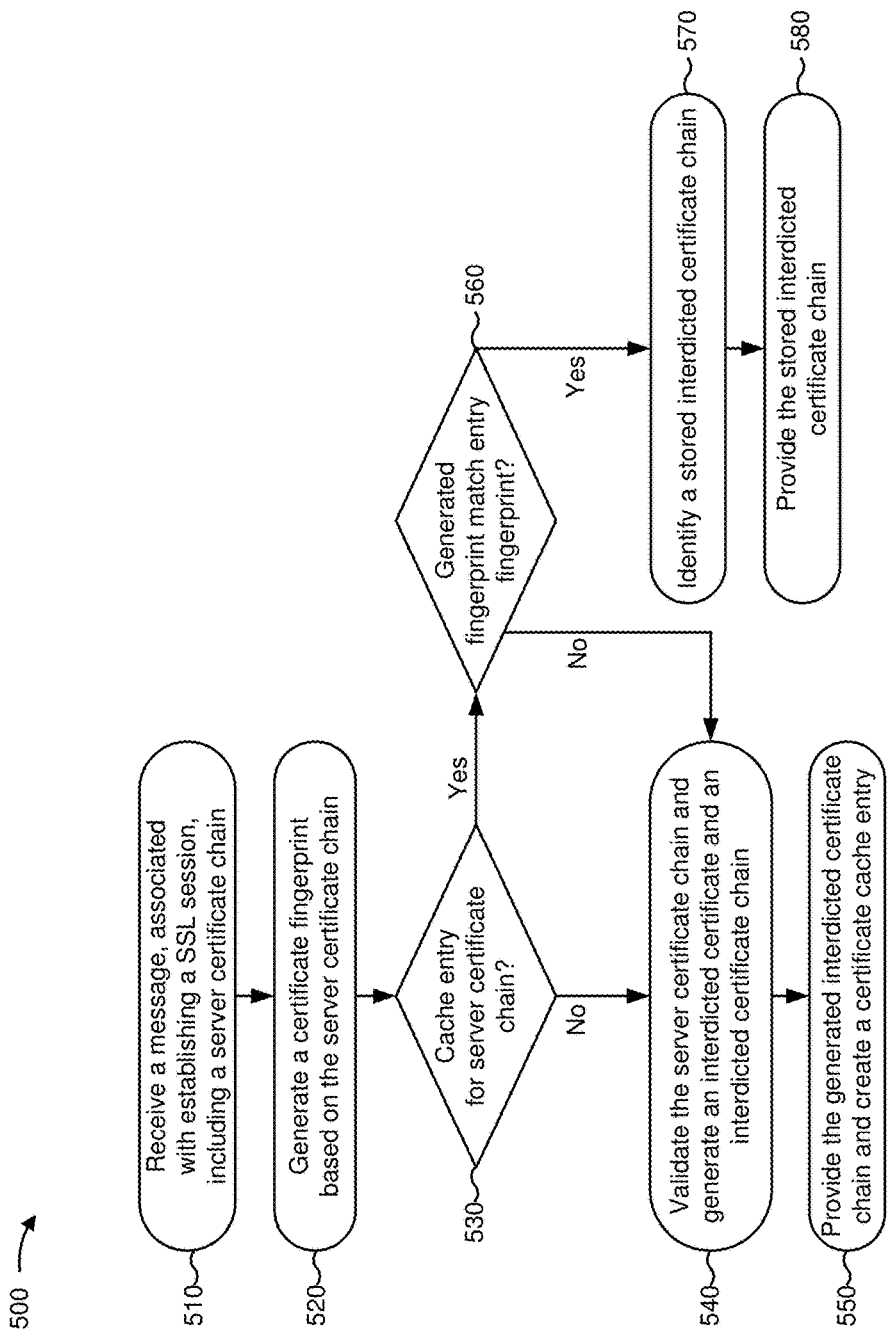

US 10,193,698 B1

AVOIDING INTERDICTED CERTIFICATE CACHE POISONING FOR SECURE SOCKETS LAYER FORWARD PROXY

RELATED APPLICATIONS

This application relates to U.S. patent application Ser. No. 14/751,409, filed on Jun. 26, 2015 and entitled "Unified Secure Socket Layer Decryption," and U.S. patent application Ser. No. 14/751,605, filed on Jun. 26, 2015 and entitled "Decryption of Secure Sockets Layer Sessions Having Enabled Perfect Forward Secrecy Using a Diffie-Hellman Key Exchange," the contents of which are incorporated by reference herein in their entirety.

BACKGROUND

Secure Sockets Layer (SSL) and Transport Layer Security (TLS) are cryptographic protocols designed to provide communications security over a communication network. SSL and TLS may use asymmetric cryptography to authenticate devices associated with the secure communications and/or to negotiate a symmetric key associated with encrypting traffic between the devices.

SUMMARY

According to some possible implementations, a method may include receiving, by a device, a message associated with establishing a secure session, where the message may include a first certificate chain associated with a server device; generating, by the device, a first certificate fingerprint associated with the first certificate chain; determining, by the device and based on the message, a policy identifier associated with a security policy for validating the first certificate chain; identifying, by the device and based on the policy identifier, a second certificate fingerprint, where the second certificate fingerprint may be associated with a second certificate chain that has been validated in accordance with the security policy; determining, by the device, whether the first certificate fingerprint matches the second certificate fingerprint; and identifying and providing, by the device, a stored interdicted certificate, associated with the second certificate chain, based on determining that the first certificate fingerprint matches the second certificate fingerprint; or generating and providing, by the device, a generated interdicted certificate, associated with the first certificate chain, based on determining that the first certificate fingerprint does not match the second certificate fingerprint.

According to some possible implementations, a device may include one or more processors to: receive a message associated with establishing a secure sockets layer (SSL) session, where the message may include a first certificate chain associated with a server device; generate a first certificate fingerprint associated with the first certificate chain; determine, based on the message, a policy identifier associated with a security policy on which the first certificate chain is to be validated; identify, based on the policy identifier, a second certificate fingerprint, where the second certificate fingerprint may be associated with a second certificate chain that has been validated based on the security policy; determine whether the first certificate fingerprint matches the second certificate fingerprint; and provide a stored interdicted certificate chain, associated with the second certificate chain, based on determining that the first certificate fingerprint matches the second certificate fingerprint; or provide a generated interdicted certificate chain, associated with the first certificate chain, based on determining that the first certificate fingerprint does not match the second certificate fingerprint.

According to some possible implementations, a computer-readable medium may store instructions that, when executed by one or more processors, cause the one or more processors to: receive a message, associated with establishing a secure session, including a first certificate chain associated with a server device; generate a first certificate fingerprint associated with the first certificate chain; determine, based on information associated with the message, a policy identifier that identifies a security policy associated with validating the first certificate chain; identify, based on the policy identifier, a second certificate fingerprint, where the second certificate fingerprint may be associated with a second certificate chain that has been validated in accordance with the security policy; determine whether the first certificate fingerprint matches the second certificate fingerprint; and provide a stored interdicted certificate chain, associated with the second certificate chain, based on determining that the first certificate fingerprint matches the second certificate fingerprint; or provide a generated interdicted certificate chain, associated with the first certificate chain, based on determining that the first certificate fingerprint does not match the second certificate fingerprint.

BRIEF DESCRIPTION OF THE DRAWINGS

FIG. 5 is a flow chart of an example process for determining whether a security device stores or has access to an interdicted certificate chain, associated with a server certificate chain, to be provided to a client device;

DETAILED DESCRIPTION

Figure 1A:
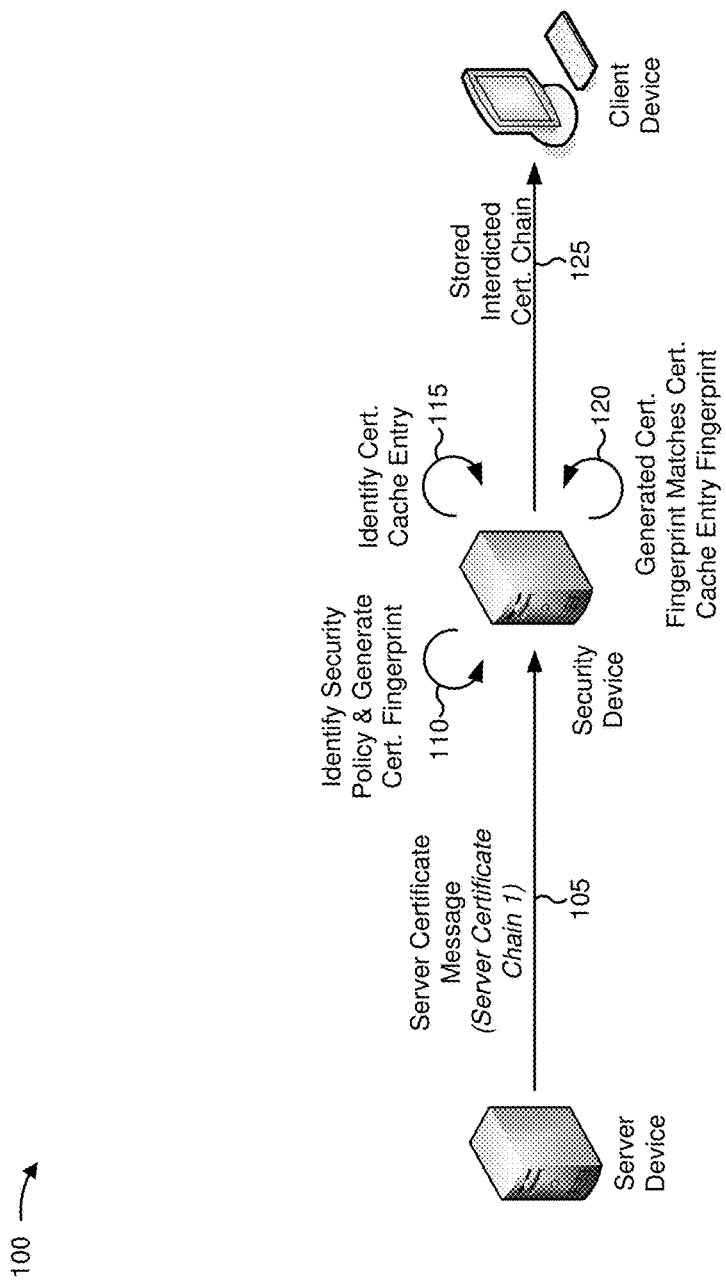
FIGS. 1A and 1B are diagrams of an overview of an example implementation described herein.

The following detailed description of example implementations refers to the accompanying drawings. The same reference numbers in different drawings may identify the same or similar elements.

A security device may host a firewall associated with managing (e.g., inspecting, processing, monitoring, etc.) traffic provided by and/or destined for a client device and/or a server device. In some implementations, the client device may be capable of initiating a secure session with the server device to allow the traffic to be encrypted (e.g., for security purposes, for privacy purposes, etc.). For example, the client device may be capable of initiating a SSL session with the server device. As such, the security device may need to be capable of managing the encrypted traffic associated with the secure session.

In some implementations, the security device may use a SSL forward proxy technique in order to manage traffic associated with a secure session. When implementing the SSL forward proxy technique, the security device may split the secure session into two parts and act as a man-in-the-middle (e.g., between the client device and the server device). Here, the security device may receive a server certificate and, optionally, one or more other certificates (herein referred to as a "server certificate chain"), provided by the server device and may validate the server certificate chain. The security device may then replace a server public key, included with the server certificate, with a public key associated with the security device. The security device may sign the server certificate with CA details for the security device. The security device may then create a new certificate chain that includes the server certificate with the public key associated with the security device (herein referred to as an interdicted certificate), followed by a certificate of a signing authority as configured on the security device, followed by a certificate of a next signing authority, and so on. The certificate chain that includes the interdicted certificate and the signing authority information may be referred to as an interdicted certificate chain.

The security device may provide the interdicted certificate to the client device. The client device may then encrypt a master key, generated by the client device and to be used to encrypt traffic associated with the secure session, using the security device public key associated with the interdicted certificate. The security device may receive the encrypted master key, and decrypt the encrypted master key using a security device private key corresponding to the security device public key. As such, the security device may have access to the master key and may be capable of decrypting encrypted traffic associated with the secure session. The SSL forward proxy technique may be implemented in a case where the server device is not known to the security device.

However, an amount of computing resources (e.g., processer resources, memory resources) consumed by the security device when implementing the SSL forward proxy technique in this manner may be relatively high as compared to, for example, implementing a SSL inbound inspection technique. The high consumption of computing resources may be caused, in part, by the validation of the server certificate chain and/or the generation of the interdicted certificate. For example, for every new SSL session, as part of a SSL handshake, the security device may need to validate the server certificate chain, including the revocation status of each certificate in the certificate chain, using, for example, one or more certificate revocation lists (CRLs) associated with one or more certificate authorities (CAs), online certificate status protocol (OCSP) requests, or the like. After the security device validates the certificate, the security device may then generate the interdicted certificate, which may consume additional computing resources.

When validating a certificate chain, the security device may need to validate each certificate in sequence (i.e., one-by-one), which may lead to an increased validation time as a quantity of certificates in the certificate chain increases. The validation using the CRLs and/or the OCSP requests may add additional time to validation of the server certificate chain. As such, validation of the server certificate chain may increase a delay associated with establishing the SSL session. Moreover, since the security device may terminate and establish the SSL session, this delay may result in a lower session per second rate associated with implementing the SSL forward proxy technique.

One technique that may be used to reduce such a delay is use of an interdicted certificate cache. For example, assume that the security device validates a server certificate chain, associated with a server device, and generates an interdicted certificate, as described above. Here, the security device may store the server certificate chain and/or information that identifies the server certificate chain, information indicating that the server certificate chain has been validated, and the interdicted certificate generated based on the server certificate chain. In this example, if another SSL session is to be established with the same server device (e.g., at a later time), the security device may retrieve the interdicted certificate from storage for provision during the SSL handshake.

However, this may lead to cache poisoning of the interdicted certificate cache when, for example, the server certificate or one or more of the signing CA certificates associated with the certificate chain is revoked after being validated by the security device (e.g., since the interdicted certificate cache may still include the information indicating that the server certificate chain was validated). Moreover, determining that the server certificate chain, received at the later time, matches the server certificate chain from which the interdicted certificate was generated may cause a delay when, for example, the security device is configured to determine that certificates in a certificate chain associated with the later received certificate match certificates associated with the original certificate from which the interdicted certificate was generated. This may also lead to increased consumption of computing resources, such as processor resources associated with analyzing the server certificate chain, memory resources associated with storing the server certificate chain, or the like.

Implementations described herein may allow a security device to use a certificate fingerprint (e.g., a value generated based on the server certificate chain using a cryptographic hash function), associated with a server certificate chain, and a policy identifier, associated with validating server certificate chains, to decrease a delay and/or reduce consumption of processor resources associated with establishing a secure session, while preventing certificate cache poisoning associated with storing and providing interdicted certificates.

Further, implementations described herein may allow the security device to detect a change associated with a server certificate chain, and invalidate a certificate cache entry associated with the server certificate chain (e.g., when the server certificate chain is changed due to a compromised server private key). Additionally, implementations described herein may allow the security device to detect (e.g., based on a CRL update, a change associated with a CA, etc.) a change associated with a security policy, associated with validating certificates associated with establishing a secure session, and/or a change associated with a trusted certificate authority (CA) associated with validating a server certificate chain at an earlier time (e.g., when the trusted CA has been compromised and the security policy is updated) in order to prevent certificate cache poisoning. For example, the security device may be capable of generating an updated policy identifier, associated with the security policy, any time a change is made to the security policy. Here, based on the updated policy identifier, the security device may detect that the security policy has been changed and, thereby, may prevent cache poisoning. Further, implementations described herein, may allow the security device to detect a change associated with a CRL that impacts a CA associated with a security policy (e.g., when the CRL indicates that a previously validated server certificate chain has been revoked) in order to prevent certificate cache poisoning.

Figure 1B:
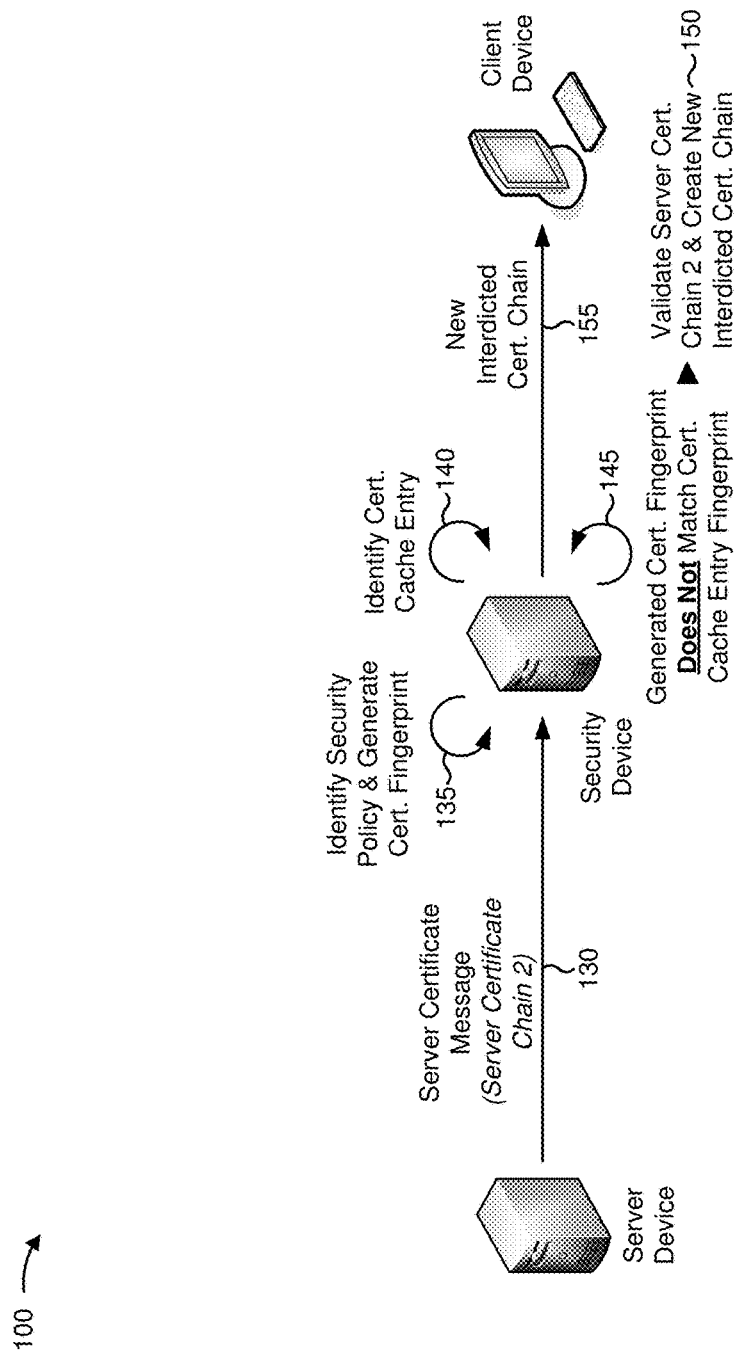

FIGS. 1A and 1B are diagrams of an overview of an example implementation 100 described herein. For the purposes of example implementation 100, assume that a security device is positioned between a client device and a server device, and that the security device hosts a firewall associated with managing, inspecting, processing, monitoring, or the like, traffic provided by and/or destined for the client device, and that the security device is configured to use a SSL forward proxy technique to manage the traffic. Further, assume that the server device provides (e.g., in response to a client message) a server certificate message associated with establishing a secure session with the client device (e.g., a server certificate message, associated with a SSL handshake procedure, provided in response to a client hello message provided by the client device).

As shown in FIG. 1A, and by reference number 105, the security device may receive the message provided by the server device. As shown, the message may include a first server certificate chain (e.g., server certificate 1) associated with the server device. In some implementations, the server certificate chain may include other information, for example, a first server certificate included in the server certificate chain may include information such as a server common name associated with the server device. In some implementations, the message may be part of a SSL handshake procedure associated with establishing the secure session. For example, the message may be a server certificate message included in a packet that also includes a server hello message associated with establishing an SSL session. For the purposes of example implementation 100, assume that the security device determines (e.g., based on inspecting a packet associated with the message) a logical system identifier and virtual routing information associated with the server device.

As shown by reference number 110, the security device may identify a security policy associated with validating the first server certificate chain. For example, the security device may determine a firewall rule based on information of a packet associated with the message, and may identify the security policy as a security policy associated with the identified firewall rule. In some implementations, a policy identifier, associated with the security policy, may be used to determine whether the security device stores or has access to a certificate cache entry associated with the first server certificate chain, as described below. As further shown by reference number 110, the security device may generate a certificate fingerprint (e.g., a string of text, an alphanumeric value, a numeric value, etc.) based on information associated with the first server certificate chain.

As shown by reference number 115, the security device may determine that the security device stores or has access to a certificate cache entry associated with the first server certificate chain. In some implementations, the security device may query a certificate cache using the server common name, the logical system identifier, the virtual routing information, and/or the policy identifier to determine whether the security device stores or has access to a certificate cache entry. In some implementations, the certificate cache entry, if found, may identify a certificate fingerprint associated with a previously validated certificate chain for which an interdicted certificate chain has been created and stored.

As shown by reference number 120, after determining that the security device stores or has access to a certificate cache entry associated with the first server certificate chain, the security device may compare the corresponding stored certificate fingerprint to the certificate fingerprint generated based on the first server certificate chain, and may determine that the stored certificate fingerprint matches the generated certificate fingerprint. As shown by reference number 125, the security device may retrieve, from storage, the interdicted certificate chain associated with the stored certificate fingerprint, and may provide the stored interdicted certificate chain to the client device for establishment of the secure session.

In another case, the security device may determine that the security device is not to use a stored interdicted certificate. As shown in FIG. 1B, and by reference number 130, the security device may receive the message provided by the server device. As shown, the message may include a second server certificate chain (e.g., server certificate 2) associated with the server device. In some implementations, the message may include other information, such as a server common name associated with the server device. For the purposes of example implementation 100, assume that the security device determines (e.g., based on inspecting a packet associated with the message) a logical system identifier, virtual routing information associated with the server device, and a policy identifier associated with a security policy for validating the second certificate chain.

For example, as shown by reference number 135, the security device may identify the security policy associated with validating the second server certificate chain, and may determine a policy identifier associated with the security policy (e.g., the security device may identify the security policy as described above with regard to FIG. 1A). As further shown by reference number 135, the security device may generate a certificate fingerprint (e.g., a string of text, an alphanumeric value, a numeric value, etc.) based on information associated with the second server certificate chain.

As shown by reference number 140, the security device may determine that the security device stores or has access to a certificate cache entry associated with the second server certificate chain. In some implementations, the security device may query a certificate cache using the server common name, the logical system identifier, the virtual routing information, and/or the policy identifier.

As shown by reference number 145, after determining that the security device stores or has access to a certificate cache entry associated with the second server certificate chain, the security device may compare the corresponding stored certificate fingerprint to the certificate fingerprint generated based on the second server certificate chain, and may determine that the stored certificate fingerprint does not match the generated certificate fingerprint. As shown by reference number 150, the security device may validate the second server certificate chain and may, after validation, generate a new interdicted certificate chain. As shown by reference number 155, the security device may provide the newly generated interdicted certificate chain to the client device. The security device may also create a certificate cache entry associated with the second server certificate chain (e.g., such that the security device need not re-generate the interdicted certificate chain at a later time).

In this way, a security device may use a certificate fingerprint, associated with a server certificate chain, and a policy identifier, associated with validating server certificate chains, to decrease a delay and/or reduce consumption of processor resources associated with establishing a secure session, while preventing certificate cache poisoning associated with storing and providing interdicted certificates.

Notably, while systems and/or methods described herein may be described in the context of using the SSL forward proxy technique, in some implementations, one or more other techniques may be used. For example, the systems and/or methods described herein may be applied to another technique associated with generating and/or providing interdicted certificates in association establishing a SSL session.

Additionally, while the systems and/or methods described herein may be described in the context of a SSL session, in some implementations, the systems and/or methods may be used in association with another type of secure session via which traffic, encrypted with a session key, is sent and/or received by a client device and/or a server device.

Figure 2:
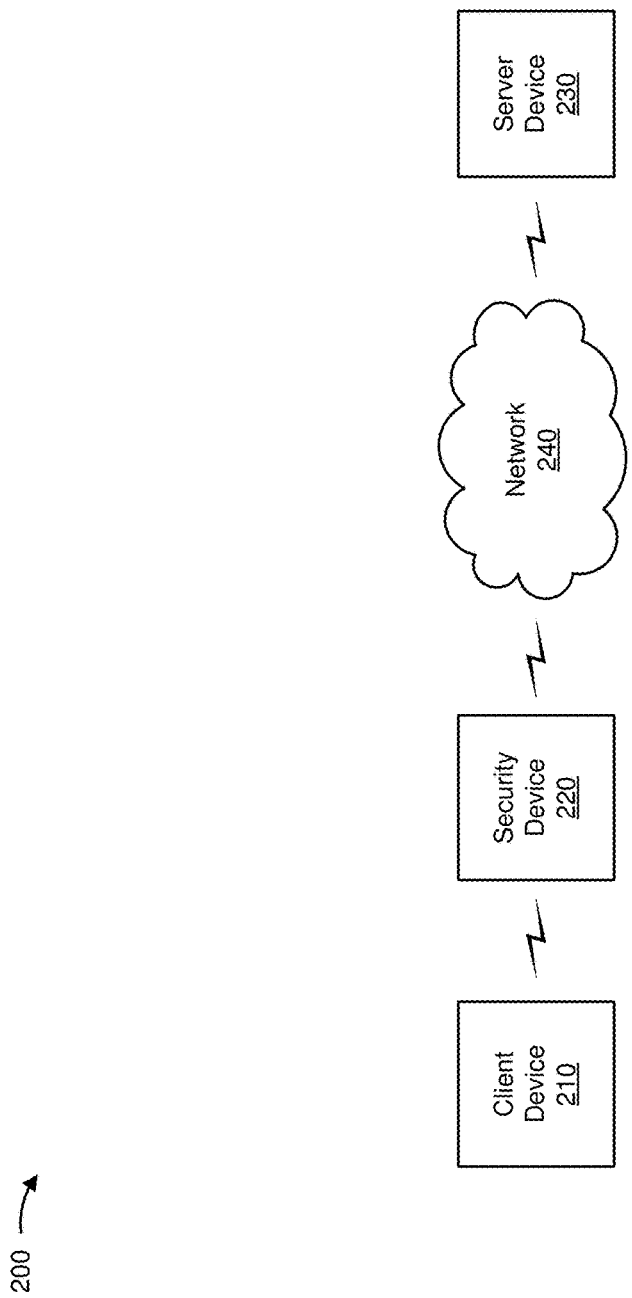
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a security device 220, a server device 230, and a network 240. Devices of environment 200 may interconnect via wired connections, wireless connections, or a combination of wired and wireless connections.

Client device 210 may include one or more devices capable of communicating with other devices, such as security device 220 and/or server device 230, via network 240. For example, client device 210 may include a computing device, such as a laptop computer, a tablet computer, a handheld computer, a desktop computer, a mobile phone (e.g., a smart phone, a radiotelephone, etc.), or a similar device. In some implementations, client device 210 may be capable of initiating a secure session with server device 230, such as a SSL session.

Security device 220 may include one or more devices capable of managing, inspecting, processing, and/or monitoring, traffic provided by and/or destined for client device 210 and associated with a secure session between client device 210 and another device, such as a SSL session between client device 210 and server device 230. For example, security device 220 may include a computing device, such as a server device or a group of server devices. Additionally, or alternatively, security device 220 may be implemented within a cloud computing network using one or more virtual machines. In some implementations, security device 220 may host a firewall associated with client device 210 and/or may store or have access to a security policy associated with one or more firewall rules corresponding to the firewall.

In some implementations, security device 220 may be capable of using a technique associated with generating and providing an interdicted certificate associated with a SSL session in order to allow security device 220 to manage encrypt traffic associated with the SSL session, such as a SSL forward proxy technique. In some implementations, security device 220 may store or have access to a certificate cache associated with one or more server devices 230. Additional details regarding security device 220 are described below with regard to FIG. 3.

In some implementations, security device 220 may include one or more devices capable of processing and/or transferring traffic associated with client device 210. For example, security device 220 may include a network device, such as a reverse proxy, a server (e.g., a proxy server), a traffic transfer device, a router, a load balancer, or the like.

In some implementations, security device 220 may be used in connection with a single client device 210 or a group of client devices 210 (e.g., included in a client network). Communications may be routed through security device 220 to reach client device(s) 210. For example, security device 220 may be positioned within a network as a gateway to a client network that includes one or more client devices 210. In some implementations, security device 220 may be used in connection with a single server device 230 or a group of server devices 230 (e.g., a data center). Communications may be routed through security device 220 to reach the one or more server devices 230. For example, security device 220 may be positioned within a network as a gateway to a private network that includes one or more server devices 230.

Server device 230 may include one or more devices capable of receiving, generating, storing, and/or providing traffic to and/or from security device 220 and/or client device 210. For example, server device 230 may include a computing device, such as a server (e.g., an application server, a content server, a host server, a web server, etc.) or a collection of servers. In some implementations, server device 230 may receive, generate, determine, process, and/or provide a server certificate chain associated with authenticating server device 230. In some implementations, server device 230 may be capable of participating in an initiation of a SSL session.

Network 240 may include one or more wired and/or wireless networks that allow client device 210 and/or server device 230 to communicate. For example, network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
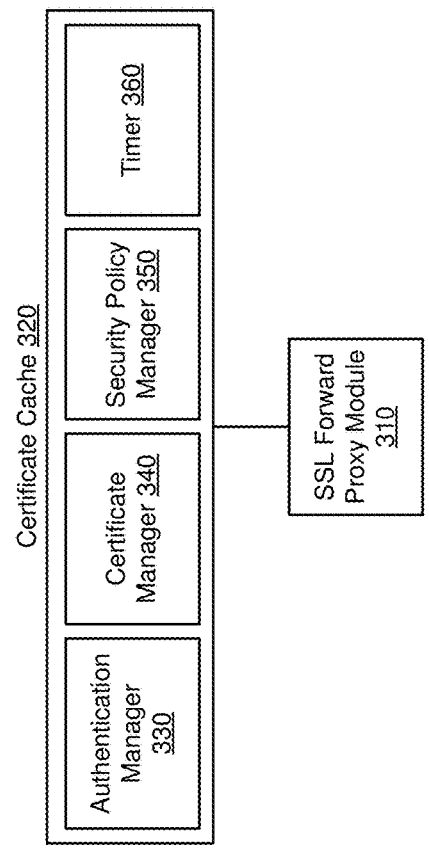
FIG. 3 is a diagram showing example functional components of the security device of FIG. 2.

FIG. 3 is a diagram of example functional components of security device 220. As shown in FIG. 3, security device 220 may include a SSL forward proxy module 310, and a certificate cache 320 that includes an authentication manager 330, a certificate manager 340, a security policy manager 350, and a timer 360.

SSL forward proxy module 310 may perform operations associated with implementing the SSL forward proxy technique to establish a SSL session and/or manage encrypted traffic associated with the SSL session. In some implementations, SSL forward proxy module 310 may be capable of performing operations, described herein, such as generating a certificate fingerprint associated with a server certificate chain, querying certificate cache 320, validating a server certificate chain, generating a new interdicted certificate chain based on the server certification, identifying a stored interdicted certificate chain, and/or providing the new interdicted certificate chain and/or the store interdicted certificate chain.

In some implementations, SSL forward proxy module 310 may be capable of generating a certificate fingerprint based on the server certificate chain. Additionally, or alternatively, SSL forward proxy module 310 may be capable of comparing a generated certificate fingerprint to a stored certificate fingerprint.

Certificate cache 320 may perform operations associated with receiving, storing, determining, processing, and/or providing information associated with operations performed by SSL forward proxy module 310. For example, certificate cache 320 may receive, store, determine, process, and/or provide information associated with a certificate cache entry. The certificate cache entry may include information, stored or accessible by certificate cache 320, associated with a server certificate chain that has been validated by security device 220. For example, the certificate cache entry may include a server common name (CN) included in the validated server certificate chain, a logical system identifier associated with server device 230, virtual routing information associated with server device 230, a policy identifier that identifies a security policy associated with validating a server certificate chain associated with server device 230, or the like. In some implementations, a cache entry may be associated with a certificate fingerprint of an entire certificate chain that corresponds to validation of all the certificates in that certificate chain. Additional details regarding the certificate cache entry are described below. In some implementations, SSL forward proxy module 310 may query certificate cache 320 to determine whether certificate cache 320 includes a certificate cache entry for a server certificate chain received by SSL forward proxy module 310.

In some implementations, certificate cache 320 may include one or more functional components associated with managing, creating, maintaining, modifying, or the like, certificate cache entries, such as authentication manager 330, certificate manager 340, security policy manager 350, and timer 360.

Authentication manager 330 may perform operations associated with receiving, determining, storing, and/or providing validation information for a server certificate chain associated with server device 230. For example, authentication manager 330 may receive, determine, store, and/or provide a validation result associated with validating a server certificate chain, such as a validation result indicating that the server certificate chain is valid, invalid, or the like. As another example, authentication manager 330 may receive, determine, store, and/or provide a certificate fingerprint associated with the server certificate chain. The certificate fingerprint may include a value that represents the server certificate chain, such as a string of text, a numerical value, an alphanumeric value, or the like. Additional details regarding the certificate fingerprint are described below. In some implementations, authentication manager may receive the validation information from SSL forward proxy module 310, another component of security device 220, and/or another device.

Certificate manager 340 may perform operations associated with receiving, storing, determining, and/or providing information associated with an interdicted certificate corresponding to the server certificate chain. For example, certificate manager 340 may receive an interdicted certificate generated by SSL forward proxy module 310, store the interdicted certificate as well as an interdicted certificate chain that includes the interdicted certificate, and provide the interdicted certificate chain at a later time. As another example, certificate manager 340 may receive, store, determine, and/or provide information associated with server device 230 to which the interdicted certificate corresponds, such as server CN, a logical system identifier associated with server device 230, virtual routing information associated with server device 230, a certificate fingerprint, a policy identifier, or the like.

In some implementations, certificate manager 340 may store information that identifies an association between the interdicted certificate and the information associated with server device 230 to which the interdicted certificate corresponds. For example, certificate manager 340 may store information that identifies an association between a particular server CN and a particular interdicted certificate when, for example, the interdicted certificate was generated based on a server certificate chain that includes the server CN. In some implementations, certificate manager 340 may receive the interdicted certificate and/or the information associated with the interdicted certificate from SSL forward proxy module 310, another component of security device 220, and/or another device.

Security policy manager 350 may perform operations associated with receiving, storing, determining, and/or providing a security policy to be used in associated with a SSL session. In some implementations, the security policy may identify information for use in validating a server certificate chain associated with the SSL session. For example, the security policy may include information that identifies one or more CAs that may be trusted when validating the server certificate chain, or the like. As another example, the security policy may include one or more CRLs associated with the one or more trusted CAs. In some implementations, the security policy may be associated with a policy identifier that may be used to identify the security policy. In some implementations, the policy identifier may be included in a certificate cache entry when, for example, a server certificate chain was validated based on the security policy associated with the policy identifier. In some implementations, security policy manager 350 may store multiple security policies.

In some implementations, the security policy may be associated with a firewall rule to be applied to encrypted traffic associated with a SSL session. For example, security device 220 may store or have access to a set of firewall rules for managing traffic associated with client device 210 and/or server device 230, where each firewall rule may be associated with a corresponding security policy that identifies information for use in validating server certificate chains associated with the SSL session. Here, security device 220 may identify an applicable firewall rule with which traffic is to be managed, and may identify the security policy associated with the firewall rule. In some implementations, a single security policy may be associated with multiple firewall rules.

In some implementations, security policy manager 350 may update, edit, and/or modify a security policy stored by security policy manager 350. For example, security policy manager may receive (e.g., periodically, on-demand, upon transmittal from another device, etc.) an updated CRL associated with a CA identified in a security policy. In this example, security policy manager 350 may update the security policy with the update CRL, and may also update the policy identifier, associated with the security policy, to create an updated policy identifier. The ability to dynamically generate an updated policy identifier may allow security device 220 to detect a change in a security policy, and thereby prevent cache poisoning.

In some implementations, when a server certificate chain is validated in accordance with the security policy, the policy identifier may be included in a certificate cache entry associated with the validated server certificate chain. As such, if the security policy and the corresponding policy identifier are updated (e.g., at a later time), and SSL forward proxy module 310 queries certificate cache 320 using the updated policy identifier (e.g., as described below), certificate cache 320 may determine that certificate cache 320 does not store a certificate cache entry responsive to the query (e.g., since the certificate cache entry would include the original policy identifier rather than the updated policy identifier). In this way, security policy manager 350 may protect against certificate cache poisoning due to an updated CRL associated with a CA. Security policy manager 350 may similarly update the policy identifier when a trusted CA is removed from the security policy (e.g., when the trusted CA is compromised, is no longer trusted by an administrator, etc.).

Timer 360 may perform operations associated with managing certificate cache entries stored by certificate cache 320. For example, timer 360 may be configured to remove, delete, invalidate, or the like, a certificate cache entry after a period of time (e.g., one hour, one day, one week, etc.). In some implementations, the period of time associated with invalidating the certificate cache entry may be configured by an administrator of security device 220.

The number and arrangement of functional components shown in FIG. 3 are provided as an example. In practice, security device 220 may include additional functional components, fewer functional components, different functional components, or differently arranged functional components than those shown in FIG. 3. Additionally, or alternatively, a set of functional components (e.g., one or more functional components) of security device 220 may perform one or more operations described as being performed by another set of functional components of security device 220.

Figure 4:
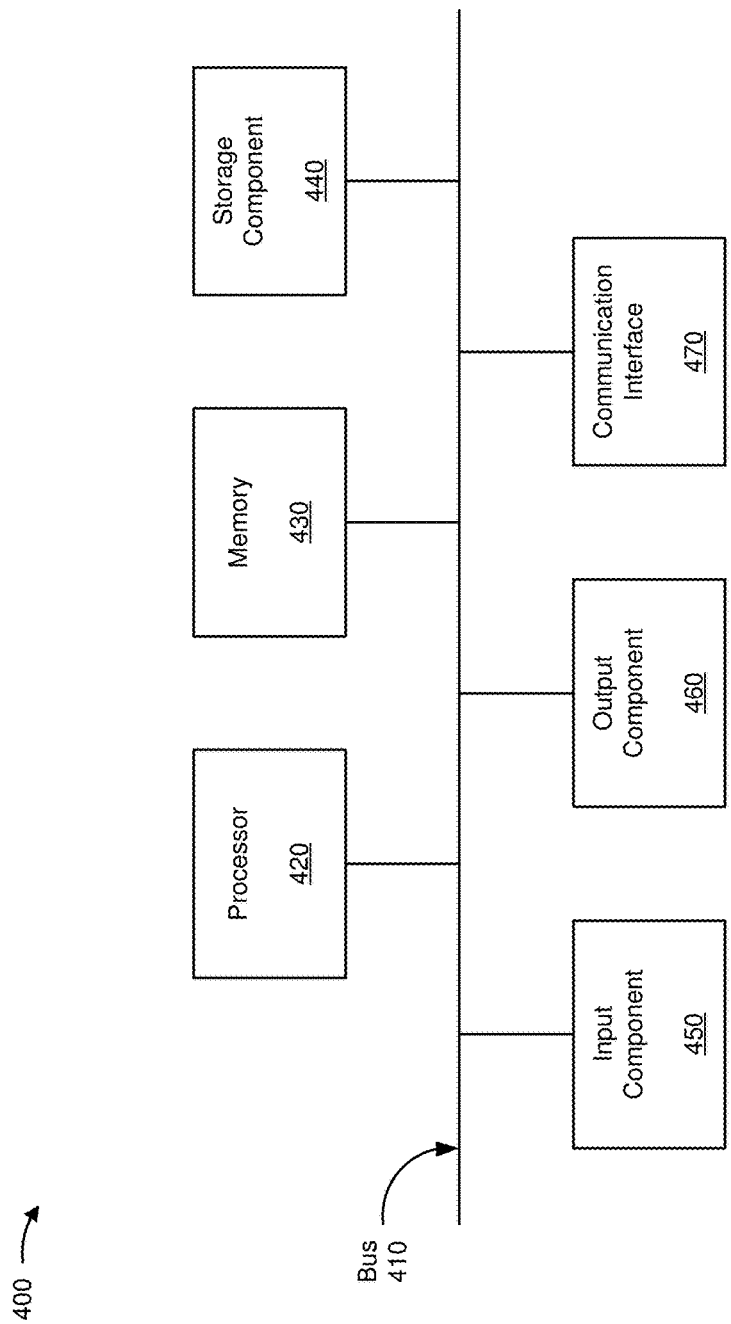
FIG. 4 is a diagram of example components of one or more devices of FIG. 2.

FIG. 4 is a diagram of example components of a device 400. Device 400 may correspond to client device 210, security device 220, and/or server device 230. In some implementations, client device 210, security device 220, and/or server device 230 may include one or more devices 400 and/or one or more components of device 400. As shown in FIG. 3, device 400 may include a bus 410, a processor 420, a memory 430, a storage component 440, an input component 450, an output component 460, and a communication interface 470.

Bus 410 may include a component that permits communication among the components of device 400. Processor 420 is implemented in hardware, firmware, or a combination of hardware and software. Processor 420 may include one or more processors (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 430 may include a random access memory (RAM), a read only memory (ROM), and/or another type of dynamic or static storage device (e.g., a flash memory, a magnetic memory, an optical memory, etc.) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 450 may include a component that permits device 400 to receive information, such as via user input (e.g., a touch screen display, a keyboard, a keypad, a mouse, a button, a switch, a microphone, etc.). Additionally, or alternatively, input component 450 may include a sensor for sensing information (e.g., a global positioning system (GPS) component, an accelerometer, a gyroscope, an actuator, etc.). Output component 460 may include a component that provides output information from device 400 (e.g., a display, a speaker, one or more light-emitting diodes (LEDs), etc.).

Communication interface 470 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for determining whether a security device stores or has access to an interdicted certificate chain, associated with a server certificate chain, to be provided to a client device. In some implementations, one or more process blocks of FIG. 5 may be performed by security device 220. In some implementations, one or more process blocks of FIG. 5 may be performed by another device or a group of devices separate from or including security device 220, such as client device 210.

As shown in FIG. 5, process 500 may include receiving a message, associated with establishing a SSL session, including a server certificate chain (block 510). For example, security device 220 may receive a message, associated with establishing a SSL session, including a server certificate chain. In some implementations, security device 220 may receive the message when another device provides the message, such as when server device 230 provides the message.

The message may include a message associated with establishing a SSL session via which client device 210 and server device 230 may securely exchange information. For example, the message may include a server certificate message, associated with establishing the SSL session, that includes a certificate chain associated with server device 230. In some implementations, the message may be part of a SSL handshake procedure associated with establishing the SSL session. For example, the message may be included in a packet that also includes a server hello message associated with establishing an SSL session.

In some implementations, the message may include a server certificate chain associated with authenticating server device 230. The server certificate chain may include information associated with authenticating server device 230 and/or information associated with server device 230, such as a public key associated with server device 230. In some implementations, the server certificate chain may include information that identifies server device 230, such as a server CN, a domain name, a host name, or the like. Additionally, or alternatively, the server certificate chain may include information that identifies a CA that has signed the server certificate chain. In some implementations, the server certificate chain may include a certificate chain that includes multiple certificates signed by multiple CAs.

In some implementations, security device 220 may receive the message based on inspecting a packet associated with the message. For example, security device 220 may be positioned between client device 210 and network 240, and may be configured to inspect (e.g., using a deep packet inspection (DPI) technique) packets destined for client device 210 and/or provided by server device 230. Here, security device 220 may, based on inspecting a packet associated with the message, determine that the packet is associated with the message.

Additionally, or alternatively, security device 220 may identify a firewall rule, associated with managing traffic associated with the SSL session, based on the message. For example, security device 220 may receive and/or determine (e.g., based on the packet associated with the message) a source Internet protocol (IP) address, a destination IP address, a source port, a destination port, a transport layer protocol, or the like, and may use some or all of this information to identify a firewall rule, associated with managing the traffic for the SSL session, based on a set of firewall rules stored or accessible by security device 220.

In some implementations, security device 220 may identify a security policy associated with the identified firewall rule. For example, security device 220 may receive and/or determine (e.g., based on information included in the message, information included in the packet associated with the message, etc.) information that may be used to identify a security policy associated with the identified firewall rule, such as a logical system identifier associated with server device 230, virtual routing information associated with server device 230, or the like, and may use some or all of this information to identify a security policy with which the firewall rule is associated when, for example, the firewall rule is associated with multiple security policies. In some implementations, a policy identifier, associated with the identified security policy, may be used to determine whether certificate cache 320 stores a certificate cache entry associated with the server certificate chain, as described below.

As further shown in FIG. 5, process 500 may include generating a certificate fingerprint based on the server certificate chain (block 520). For example, security device 220 may generate a certificate fingerprint based on the server certificate chain included in the message received by security device 220. In some implementations, security device 220 may generate the certificate fingerprint after security device 220 receives the message associated with initiating the SSL session. Additionally, or alternatively, security device 220 may generate the certificate fingerprint at another time, such as after security device 220 determines whether certificate cache 320 stores a certificate cache entry associated with the server certificate chain, as described below.

The certificate fingerprint may include a value that represents the server certificate chain, such as a string of text, a numerical value, an alphanumeric value, or the like. In some implementations, security device 220 may generate the certificate fingerprint using a cryptographic hash function, such as a message authentication code (MAC) function, a secure hash algorithm (SHA), a message-digest algorithm (e.g., MD4, MD5, etc.), or the like. For example, security device 220 may inspect each certificate in the server certificate chain to determine a set of certificate identifiers associated with the certificate chain, such as a serial number associated with each certificate, an issuer identifier associated with each certificate, a subject identifier associated with each certificate, validity information associated with each certificate, or the like. Here, security device 220 may provide a buffer and/or memory containing the certificate chain as an input to the cryptographic hash function and may receive the certificate fingerprint as an output of the cryptographic hash function. In this way, a unique certificate fingerprint may be generated for the server certificate chain. Moreover, generating the certificate fingerprint in this manner may allow security device 220 to detect any modification to the server certificate chain (e.g., since any modification to the server certificate chain would cause a different certificate fingerprint to be generated by the cryptographic hash function).

In some implementations, use of the certificate fingerprint may reduce an amount of processor and/or memory resources consumed by security device 220. For example, an amount of memory resources consumed by security device 220 may be reduced when security device 220 is configured to store the certificate fingerprint rather than the server certificate chain. As another example, an amount of processor resources consumed by security device 220 may be reduced when security device 220 is configured to determine whether a later received server certificate chain matches the server certificate chain (e.g., since security device 220 may compare certificate fingerprints rather than the server certificates), as described below.

As further shown in FIG. 5, process 500 may include determining whether a certificate cache includes a certificate cache entry associated with the server certificate chain (block 530). For example, security device 220 may determine whether certificate cache 320 includes a certificate cache entry (herein referred to as an "entry") associated with the server certificate chain. In some implementations, security device 220 may determine whether certificate cache 320 includes an entry after security device 220 generates the certificate fingerprint. Additionally, or alternatively, security device 220 may determine whether certificate cache 320 includes an entry after security device 220 receives the message.

As described above, the entry may include information, stored or accessible by certificate cache 320, associated with a server certificate chain that has been validated by security device 220. For example, the entry may include a server CN included in the validated server certificate chain, a logical system identifier for server device 230 associated with the validated certificate, virtual routing information for server device 230 associated with the validated certificate, a policy identifier that identifies a security policy associated with the validated certificate, or the like. In some implementations, the certificate cache entry may be associated with one or more certificate fingerprints. In some implementations, presence of the entry may indicate that security device 220 stores or has access to a previously generated interdicted certificate chain, associated with the server certificate chain, that may be provided by security device 220 (e.g., in lieu of generating another interdicted certificate) when a certificate fingerprint, associated with the entry, matches the generated certificate fingerprint.

In some implementations, security device 220 may determine whether certificate cache 320 includes an entry based on information associated with the server certificate chain and/or information associated with server device 230. For example, as described above, security device 220 may determine the server CN, the logical system identifier, the virtual routing information, and the policy identifier based on the message. In this example, server device 230 may query certificate cache 320 using the server CN, the logical system identifier, the virtual routing information, and the policy identifier. Security device 220 may determine that an entry is present when certificate cache 320 stores or has access to an entry that includes the server CN, the logical system identifier, the virtual routing information, and the policy identifier (e.g., when all items of information are present in the entry, when a threshold number of items are present in the entry, etc.). In such a case, certificate cache 320 may determine a certificate fingerprint corresponding to the entry. Alternatively, security device 220 may determine that an entry is not present when certificate cache 320 does not store or have access to an entry that includes the server CN, the logical system identifier, the virtual routing information, and the policy identifier (e.g., when none of the items of information are present in an entry, when less than a threshold number of items of information are present in an entry, etc.).

As further shown in FIG. 5, if the certificate cache does not include a certificate cache entry associated with the server certificate chain (block 530—NO), then process 500 may include validating the server certificate chain and generating an interdicted certificate and an interdicted certificate chain (block 540). For example, security device 220 may determine that certificate cache 320 does not store or have access to an entry associated with the server certificate chain, and security device 220 may validate the server certificate chain and generate an interdicted certificate (e.g., corresponding to the server certificate) and an interdicted certificate chain that includes information associated with a CA that signed the interdicted certificate, a certificate of a next signing authority, and so on.

In some implementations, security device 220 may validate the server certificate chain in order to authenticate a server public key included in the server certificate chain. For example, security device 220 may determine whether the server certificate chain terminates in one or more CAs that are identified as trusted CAs in the security policy or signed by a trusted CA in the security policy. In such a case, security device 220 may validate the server certificate chain. Alternatively, security device 220 may not be able to validate the server certificate chain when, for example, the server certificate chain does not terminate at a trusted CA, is not signed by a trusted CA, or the like, and may act accordingly (e.g., by dropping the SSL session, by providing a warning to client device 210, etc.). In some implementations, security device 220 may store a validation result indicating whether the server certificate chain is valid. The validation result may be associated with the certificate fingerprint in order to indicate whether the server certificate chain, associated with the certificate fingerprint, has been validated. In some implementations, security device 220 may determine whether the server certificate chain is valid based on other information, such as validity information included in the server certificate chain.

In some implementations, after validating the server certificate chain, security device 220 may generate an interdicted certificate associated with the server certificate. In some implementations, as described above, the interdicted certificate may include a public key associated with security device 220 (herein referred to as a security public key), rather than a server public key. In some implementations, as described above, security device 220 may generate an interdicted certificate chain that includes the interdicted certificate, a certificate of a CA that signed the interdicted certificate, a certificate of a next signing authority, and so on. As described above, security device 220 may generate the interdicted certificate in order to allow security device 220 to determine the master key associated with the SSL session using a security private key corresponding to the security public key (e.g., since client device 210 may encrypt the master key with the security public key).

As further shown in FIG. 5, process 500 may include providing the generated interdicted certificate chain and creating a certificate cache entry (block 550). For example, security device 220 may provide the generated interdicted certificate chain and may create an entry associated with the server certificate chain. In some implementations, security device 220 may provide the generated interdicted certificate chain and create the entry after security device 220 generates the interdicted certificate chain.

In some implementations, security device 220 may provide the generated interdicted certificate chain to client device 210. For example, security device 220 may provide the generated interdicted certificate chain to client device 210 in order to indicate, to client device 210, that the server certificate chain has been validated and that client device 210 may encrypt the master session key (e.g., using the security public key) in order to proceed with establishing the SSL session.

Additionally, or alternatively, security device 220 may provide the generated interdicted certificate for storage. For example, security device 220 may provide the generated interdicted certificate for storage, such that the generated interdicted certificate may be retrieved at a later time. In some implementations, security device 220 may store information that identifies an association between the generated certificate fingerprint and the generated interdicted certificate (e.g., such that the generated interdicted certificate may be retrieved based on the certificate fingerprint at a later time). Notably, security device 220 may not store the server certificate chain. In some implementations, security device 220 may store the interdicted certificate only (e.g., since the interdicted certificate may include information sufficient to generate the interdicted certificate chain). Additionally, or alternatively, security device 220 may store the complete interdicted certificate chain (e.g., including the interdicted certificate).

In some implementations, security device 220 may create an entry associated with the generated interdicted certificate. For example, as described above, security device 220 may create an entry that includes the server CN associated with the validated server certificate chain, the logical system identifier for server device 230 associated with the validated certificate, the virtual routing information for server device 230 associated with the validated certificate, the policy identifier that identifies the security policy associated with the validated certificate, information that indicates an association with the certificate fingerprint, or the like. In some implementations, security device 220 may store an indication that the generated interdicted certificate corresponds to the created entry. In some implementations, the entry may be queried by security device 220 at a later time, as described above.

In some implementations, an entry may become invalidated at a later time. For example, assume that security device 220 creates an entry at a first time, associated with a validated server certificate chain, that includes a server CN, a logical system identifier, virtual routing information, a first policy identifier, and a certificate fingerprint. Further, assume that security device 220 receives, at a second (i.e., later) time, information (e.g., a CRL update, an indication to remove a trusted CA, etc.) that causes the security policy (e.g., that was used to validate the server certificate chain and is associated with the first policy identifier) to be updated. Here, upon updating the security policy, security device 220 may also update the first policy identifier to create a second policy identifier (e.g., to reflect the security policy update).

Now, assume that security device 220 receives, at a third time, the same server certificate chain from the same server device 230. Here, security device 220 may determine the server CN, the logical system identifier, the virtual routing information, and the second policy identifier (e.g., since the updated security policy now applies with respect to validating the server certificate chain). As such, when security device 220 queries certificate cache 320 to determine whether certificate cache 320 stores an entry associated with the server certificate chain, security device 220 may determine that no entry is stored (e.g., since the first policy identifier is included in the entry, rather than the second policy identifier). In this way, security device 220 may prevent cache poisoning associated with stored interdicted certificates.

In some implementations, security device 220 may delete an entry that has been invalidated. For example, security device 220 may, after updating the policy identifier, delete one or more entries that include a previous policy identifier. As another example, security device 220 may delete one or more entries based on an indication from timer 360 (e.g., when timer 360 is configured to invalidate the one or more entries after a period of time). Additionally, or alternatively, security device 220 may store an indication that the entry is invalid (e.g., without deleting the entry).

As further shown in FIG. 5, if the certificate cache includes a certificate cache entry associated with the server certificate chain (block 530—YES), then process 500 may include determining whether the generated certificate fingerprint matches a certificate fingerprint associated with the certificate cache entry (block 560). For example, if security device 220 determines that certificate cache 320 includes an entry associated with the server certificate chain, then security device 220 may determine whether the generated certificate fingerprint matches a certificate fingerprint associated with the entry.

In some implementations, security device 220 may determine whether the generated certificate fingerprint matches the certificate fingerprint associated with the entry (also referred to herein as a "stored certificate fingerprint") based on comparing the generated certificate fingerprint to the stored certificate fingerprint. In some implementations, the stored certificate fingerprint may match the generated certificate fingerprint when the server certificate chain from which that the stored certificate fingerprint was generated is identical to the server certificate chain from associated with the newly generated certificate fingerprint. In this way, any change to the server certificate chain may be detected without inspecting the entire server certificate chain. This may lead to increased SSL session establishment speed and/or reduced consumption of processor resources.

As further shown in FIG. 5, if the generated certificate fingerprint does not match the certificate fingerprint associated with the certificate cache entry (block 560—NO), then process 500 may include validating the server certificate chain and generating an interdicted certificate (block 540). For example, security device 220 may determine that the generated certificate fingerprint does not match the stored certificate fingerprint associated with the certificate cache entry, and security device 220 may validate the server certificate chain and generate an interdicted certificate chain, as described above.

As further shown in FIG. 5, if the generated certificate fingerprint matches the certificate fingerprint associated with the certificate cache entry (block 560—YES), then process 500 may include identifying a stored interdicted certificate chain (block 570). For example, security device 220 may determine that the generated certificate fingerprint matches the stored certificate fingerprint associated with the entry, and security device 220 may identify a stored interdicted certificate chain associated with the entry and/or the stored certificate fingerprint.

In some implementations, security device 220 may identify the stored interdicted certificate chain based on the certificate fingerprint. For example, as described above, SSL forward proxy module 310 may validate a server certificate chain, generate and store (e.g, in certificate cache 320) an interdicted certificate chain associated with the server certificate chain, and store information that identifies an association with a certificate fingerprint generated based on the server certificate chain. In this example, security device 220 may identify the stored interdicted certificate based on the certificate fingerprint.

As further shown in FIG. 5, process 500 may include providing the stored interdicted certificate chain (block 580). For example, security device 220 may provide the stored interdicted certificate chain. In some implementations, security device 220 may provide the stored interdicted certificate chain after security device 220 identifies the stored interdicted certificate chain.

In some implementations, security device 220 may provide the stored interdicted certificate chain to client device 210. For example, security device 220 may provide the stored interdicted certificate chain to client device 210 in order to indicate, to client device 210, that the server certificate chain has been validated and that client device 210 may encrypt the master session key (e.g., using the security device public key) in order to proceed with establishing the SSL session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
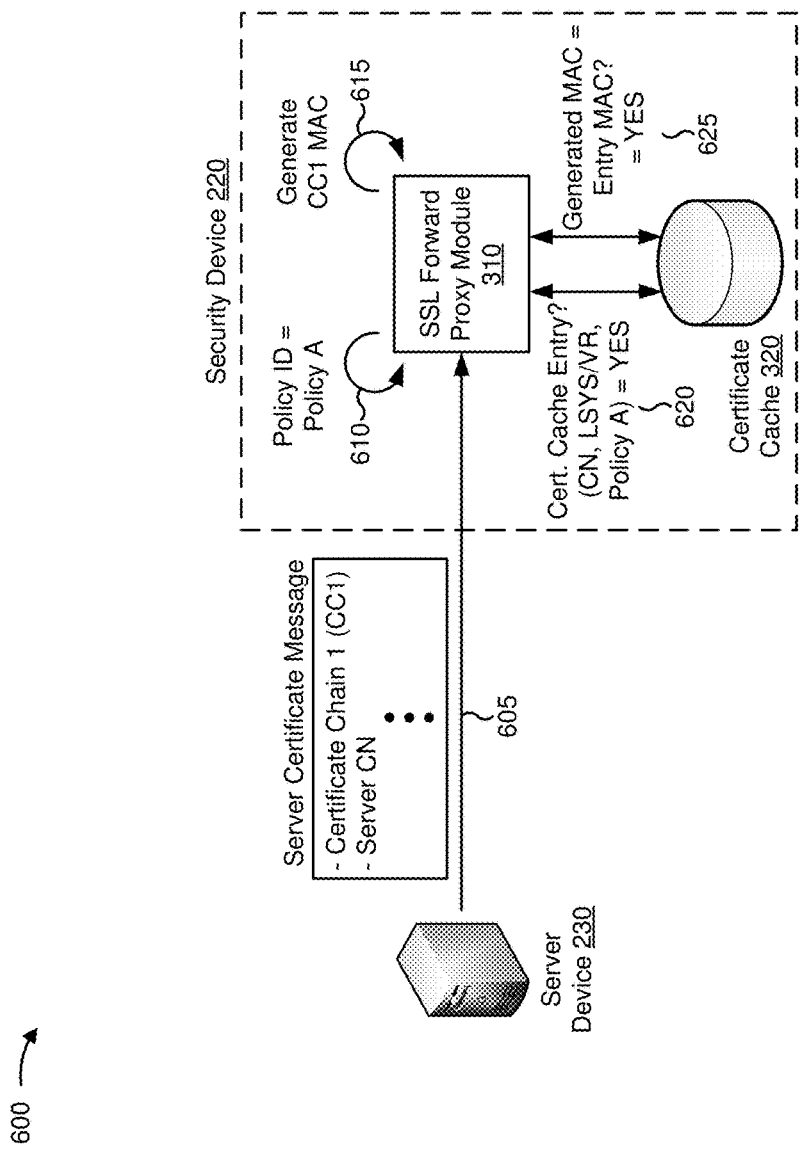
FIGS. 6A and 6B are diagrams of an example implementation relating to the example process shown in FIG. 5.
Figure 6B:
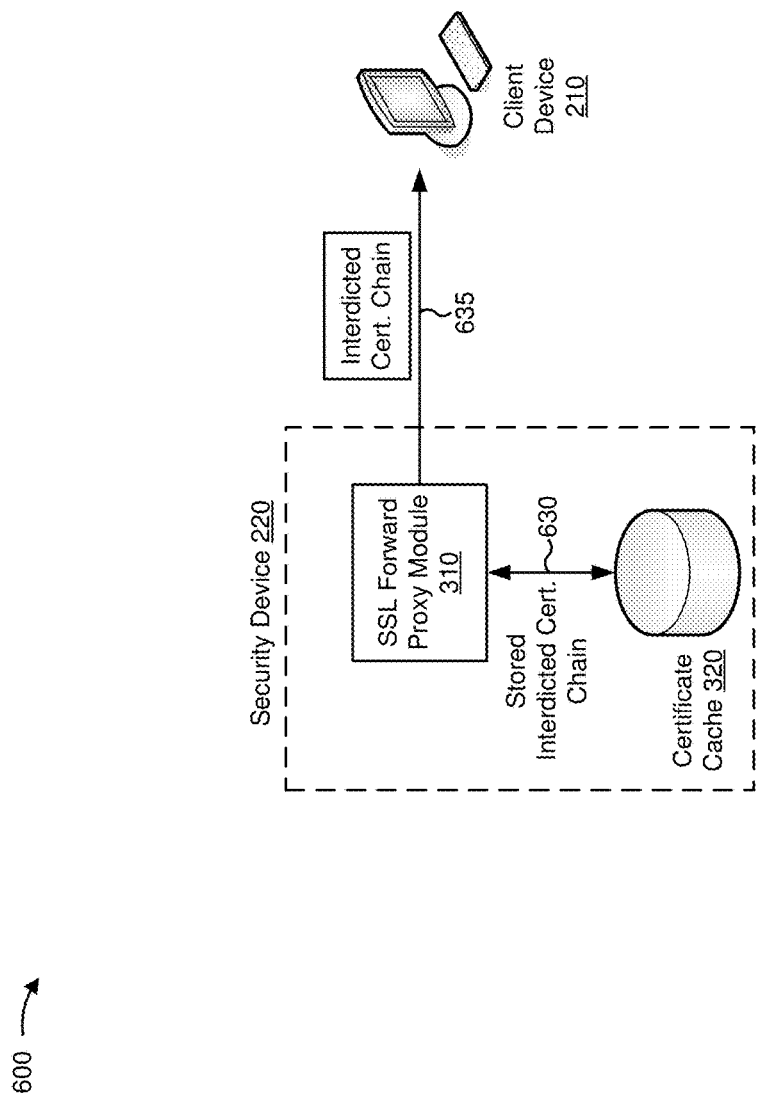

FIGS. 6A and 6B are diagrams of an example implementation 600 relating to example process 500 shown in FIG. 5. For the purposes of example implementation 600, assume that security device 220 is positioned between client device 210 and server device 230, and that security device 220 hosts a firewall associated with managing, inspecting, processing, monitoring, or the like, traffic provided by and/or destined for client device 210. Further, assume that server device 230 provides (e.g., in response to a SSL client hello message) a server certificate message associated with establishing a SSL session with client device 210.

As shown in FIG. 6A, and by reference number 605, security device 220 (e.g., SSL forward proxy module 310) may receive the server certificate message provided by server device 230. As shown, the server certificate message may include a server certificate chain (e.g., CC1). As further shown, the server certificate message and/or the server certificate chain may include a server CN associated with server device 230. For the purposes of example implementation 600, assume that SSL forward proxy module 310 determines (e.g., based on inspecting a packet associated with the server certificate message) a logical system identifier and virtual routing information associated with server device 230.

As shown by reference number 610, SSL forward proxy module 310 may identify a security policy (e.g., policy A) associated with validating the server certificate chain. For example, SSL forward proxy module 310 may determine a firewall rule based on information of the packet associated with the server certificate message, such as a source IP address, a destination IP address, a source port, a destination port, or the like. SSL forward proxy module 310 may then identify the security policy as a security policy associated with the identified firewall rule.

As shown by reference number 615, security device 220 may generate a certificate fingerprint associated with the server certificate chain (e.g., CC1 MAC). As shown by reference number 620, SSL forward proxy module 310 may query certificate cache 320 to determine whether certificate cache 320 includes an entry associated with the server certificate chain. As shown, SSL forward proxy module 310 may query certificate cache 320 using the server CN, the logical system identifier, the virtual routing information, and the policy identifier. As shown, certificate cache 320 may include an entry corresponding to the server CN, the logical system identifier, the virtual routing information, and the policy identifier. Further, the entry may identify a stored certificate fingerprint associated with the entry.

As shown by reference number 625, SSL forward proxy module 310 may determine (e.g., based on querying certificate cache 320) that the generated certificate fingerprint matches the stored certificate fingerprint associated with the entry.

As shown in FIG. 6B, and by reference number 630, SSL forward proxy module 310 may retrieve (e.g., based on querying certificate cache 320 using the server CN, the logical system identifier, the virtual routing information, and/or the policy identifier) an interdicted certificate associated with the server certificate chain. As shown by reference number 635, SSL forward proxy module 310 may provide the interdicted certificate, retrieved from storage, to client device 210 for establishment of the SSL session.

In this way, SSL forward proxy module 310 may determine, based on the certificate cache entry and the certificate fingerprint, that the server certificate chain is valid, and thus may not need to re-validate the server certificate chain and/or re-create an interdicted certificate chain.

As indicated above, FIGS. 6A and 6B are provided merely as an example. Other examples are possible and may differ from what was described with regard to FIGS. 6A and 6B.

Figure 7A:
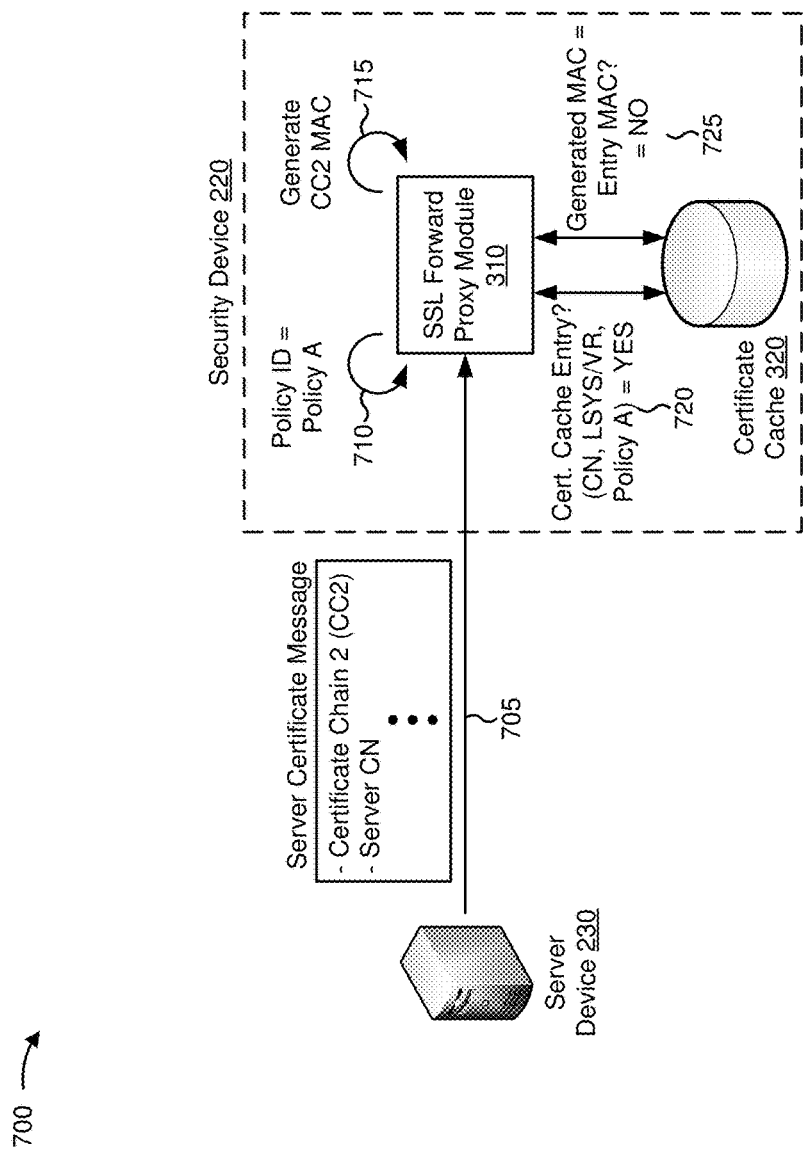
FIGS. 7A and 7B are diagrams of an additional example implementation relating to the example process shown in FIG. 5.
Figure 7B:
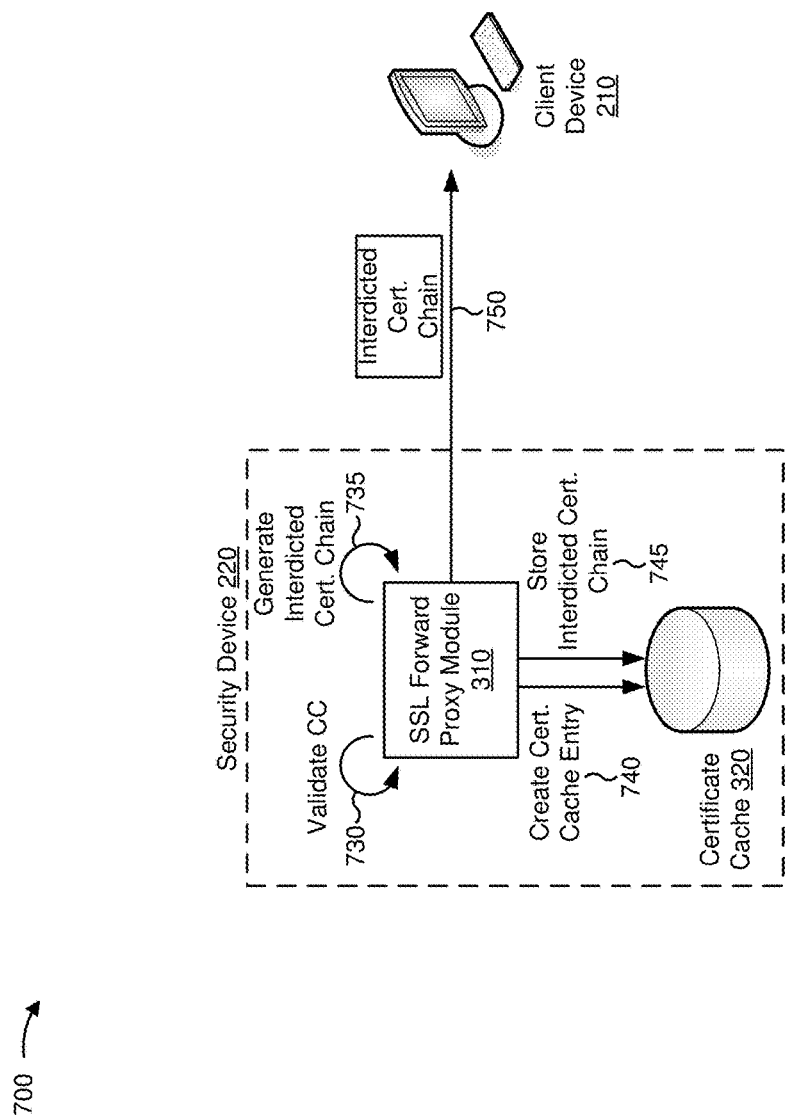

FIGS. 7A and 7B are diagrams of an additional example implementation 700 relating to example process 500 shown in FIG. 5. Example implementation 700 shows a scenario in which a previously validated server certificate chain has been modified, while a security policy associated with validating the server certificate chain has not been modified. For the purposes of example implementation 700, assume that security device 220 is positioned between client device 210 and server device 230, and that security device 220 hosts a firewall associated with managing, inspecting, processing, monitoring, or the like, traffic provided by and/or destined for client device 210. Further, assume that server device 230 provides (e.g., in response to a SSL client hello message) a server certificate message associated with establishing a SSL session with client device 210.

As shown in FIG. 7A, and by reference number 705, security device 220 (e.g., SSL forward proxy module 310) may receive the server certificate message provided by server device 230. As shown, the server certificate message may include a server certificate chain (e.g., CC2, a server certificate chain different than CC1 described with regard to example implementation 600). As further shown, the server certificate message and/or the server certificate chain may include a server CN associated with server device 230. For the purposes of example implementation 700, assume that SSL forward proxy module 310 determines (e.g., based on inspecting a packet associated with the server certificate message) a logical system identifier and virtual routing information associated with server device 230.

As shown by reference number 710, SSL forward proxy module 310 may identify a security policy (e.g., policy A) associated with validating the server certificate chain. For example, SSL forward proxy module 310 may determine a firewall rule based on information of the packet associated with the server certificate message, such as a source IP address, a destination IP address, a source port, a destination port, or the like. SSL forward proxy module 310 may then identify the security policy as a security policy associated with the identified firewall rule.

As shown by reference number 715, security device 220 may generate a certificate fingerprint associated with the server certificate chain (e.g., CC2 MAC). As shown by reference number 720, SSL forward proxy module 310 may query certificate cache 320 to determine whether certificate cache 320 includes an entry associated with the server certificate chain. As shown, SSL forward proxy module 310 may query certificate cache 320 using the server CN, the logical system identifier, the virtual routing information, and the policy identifier. As shown, certificate cache 320 may include an entry corresponding to the server CN, the logical system identifier, the virtual routing information, and the policy identifier. Further, the entry may identify a stored certificate fingerprint associated with the entry.

As shown by reference number 725, SSL forward proxy module 310 may determine (e.g., based on querying certificate cache 320) that the generated certificate fingerprint does not match the stored certificate fingerprint associated with the entry.

As shown in FIG. 7B, and by reference number 730, SSL forward proxy module 310 may validate the server certificate chain. As shown by reference number 735, SSL forward proxy module 310 may generate an interdicted certificate based on the server certificate. As shown by reference number 740, SSL forward proxy module 310 may create an entry associated with the validated certificate (e.g., such that certificate cache 320 may be queried at a later time). As shown by reference number 745, SSL forward proxy module 310 may store the generated interdicted certificate chain (e.g., such that the generated interdicted certificate chain may be retrieved at a later time). As shown by reference number 750, SSL forward proxy module 310 may provide the generated interdicted certificate chain to client device 210 for establishment of the SSL session.

In this way, SSL forward proxy module 310 may determine that the server certificate chain is valid, but that an entry stored by certificate cache 320 is not associated with a certificate fingerprint that matches the server certificate chain. As such, SSL forward proxy module 310 may create an entry, associated with the validated certificate, and may generate and provide an interdicted certificate chain. As indicated above, FIGS. 7A and 7B are provided merely as an example. Other examples are possible and may differ from what was described with regard to FIGS. 7A and 7B.

Figure 8:
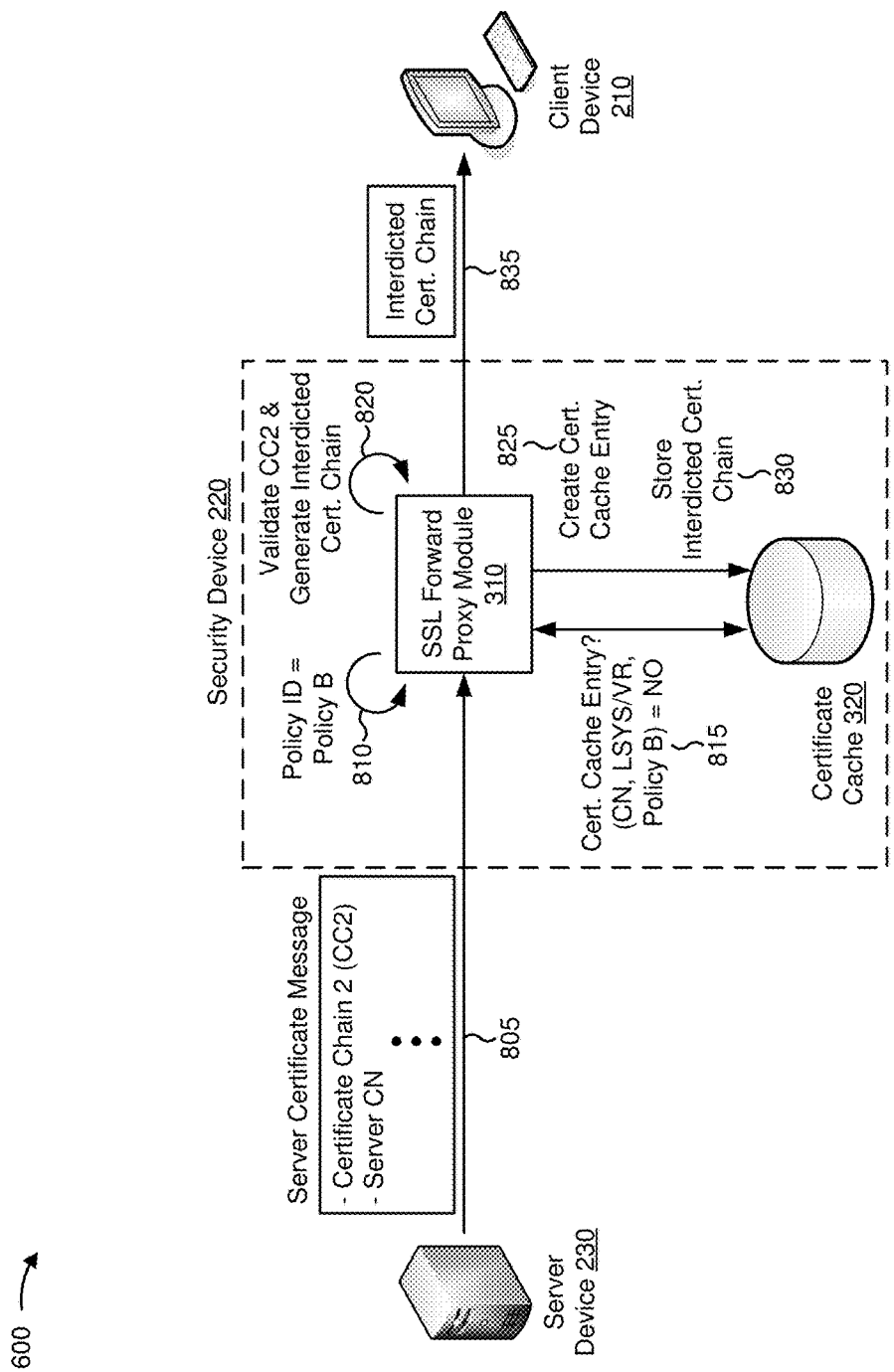
FIG. 8 is a diagram of another example implementation relating to the example process shown in FIG. 5.

FIG. 8 is a diagram of an additional example implementation 800 relating to example process 500 shown in FIG. 5. Example implementation 800 shows a scenario in which a previously validated server certificate chain has not been modified, but a security policy associated with validating the server certificate chain has been modified. For the purposes of example implementation 800, assume that security device 220 is positioned between client device 210 and server device 230, and that security device 220 hosts a firewall associated with managing, inspecting, processing, monitoring, or the like, traffic provided by and/or destined for client device 210. Further, assume that server device 230 provides (e.g., in response to a SSL client hello message) a server certificate message associated with establishing a SSL session with client device 210.

As shown in FIG. 8, and by reference number 805, security device 220 (e.g., SSL forward proxy module 310) may receive the server certificate message provided by server device 230. As shown, the server certificate message may include a server certificate chain (e.g., CC2, the same server certificate chain associated with example implementation 700). As further shown, the server certificate message and/or the server certificate chain may include a server CN associated with server device 230. For the purposes of example implementation 800, assume that SSL forward proxy module 310 determines (e.g., based on inspecting a packet associated with the server certificate message) a logical system identifier and virtual routing information associated with server device 230.

As shown by reference number 810, SSL forward proxy module 310 may identify a security policy (e.g., policy B) associated with validating the server certificate chain. For example, SSL forward proxy module 310 may determine a firewall rule based on information of the packet associated with the server certificate message, such as a source IP address, a destination IP address, a source port, a destination port, or the like. SSL forward proxy module 310 may then identify the security policy as a security policy associated with the identified firewall rule. For the purposes of example implementation 800, assume that policy B identifies an updated version of the security policy that was previously identified in example implementations 600 and 700 as policy A (e.g., due to an updated CRL associated with a CA identified in the security policy).

As shown by reference number 815, SSL forward proxy module 310 may query certificate cache 320 to determine whether certificate cache 320 includes an entry associated with the server certificate chain. As shown, SSL forward proxy module 310 may query certificate cache 320 using the server CN, the logical system identifier, the virtual routing information, and the policy identifier. As shown, certificate cache 320 may not include an entry corresponding to the server CN, the logical system identifier, the virtual routing information, and the policy identifier (e.g., since the policy identifier is policy B, rather than policy A, the previous entry associated with the server certificate chain may not be returned as a match to the query).

As shown by reference number 820, SSL forward proxy module 310 may validate the server certificate chain and generate an interdicted certificate based on the server certificate. SSL forward proxy module 310 may also generate an interdicted certificate chain that includes the interdicted certificate. As shown by reference number 825, SSL forward proxy module 310 may generate a certificate fingerprint and may create an entry associated with the validated server certificate chain (e.g., such that certificate cache 320 may be queried at a later time). As shown by reference number 830, SSL forward proxy module 310 may store the generated interdicted certificate chain (e.g., such that the generated interdicted certificate chain may be retrieved at a later time). As shown by reference number 835, SSL forward proxy module 310 may provide the generated interdicted certificate chain to client device 210 for establishment of the SSL session.

In this way, SSL forward proxy module 310 may determine that the server certificate chain is valid, but that certificate cache 320 does not store an entry associated with the server certificate chain. Moreover, certificate cache 320 may be protected from certificate cache poisoning (e.g., due to the updated policy identifier).

As indicated above, FIG. 8 is provided merely as an example. Other examples are possible and may differ from what was described with regard to FIG. 8.

Implementations described herein may allow a security device to use a certificate fingerprint, associated with a server certificate chain, and a policy identifier, associated with validating server certificate chains, to decrease a delay and/or reduce consumption of processor resources and/or memory resources associated with establishing a secure session, while preventing certificate cache poisoning associated with storing and providing interdicted certificates.

Further, implementations described herein may allow the security device to detect a change associated with a server certificate chain, and invalidate a certificate cache entry associated with the server certificate chain (e.g., when the server certificate chain is changed due to a compromised server private key). Additionally, implementations described herein may allow the security device to detect a change for a security policy, associated with managing traffic of a secure session, and/or a change of a trusted certificate authority (CA) associated with validating a server certificate chain at an earlier time (e.g., when the trusted CA has been compromised and the security policy is updated) in order to prevent certificate cache poisoning. Further, implementations described herein, may allow the security device to detect a change associated with a CRL that impacts a CA associated with a security policy (e.g., when the CRL indicates that a previously validated server certificate chain has been revoked) in order to prevent certificate cache poisoning.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a message associated with establishing a secure session, the message including a first certificate chain associated with a server device, the first certificate chain including a plurality of certificates;
   providing, by the device, information associated with each of the plurality of certificates included in the first certificate chain as an input to a cryptographic hash function;
   receiving, by the device, a first certificate fingerprint as an output of the cryptographic hash function;
   determining, by the device, that the device stores or has access to a certificate cache entry associated with the first certificate chain;
   identifying, by the device and based on determining that the device stores or has access to the certificate cache entry, a second certificate fingerprint associated with the certificate cache entry, the second certificate fingerprint being based on a second certificate chain that has been validated;
   determining, by the device, whether the first certificate fingerprint matches the second certificate fingerprint; and
   identifying and providing, by the device, a stored interdicted certificate associated with the second certificate chain or the second certificate fingerprint based on determining that the first certificate fingerprint matches the second certificate fingerprint; or
   generating and providing, by the device, a generated interdicted certificate, associated with the first certificate chain, based on determining that the first certificate fingerprint does not match the second certificate fingerprint.

2. The method of claim 1, where determining whether the first certificate fingerprint matches the second certificate fingerprint comprises:
   comparing the first certificate fingerprint and the second certificate fingerprint;
   determining whether the first certificate fingerprint is identical to the second certificate fingerprint based on the comparison; and
   determining whether the first certificate fingerprint matches the second certificate fingerprint based on whether the first certificate fingerprint is identical to the second certificate fingerprint.

3. The method of claim 1, further comprising:
   identifying a firewall rule associated with managing traffic for the secure session;
   identifying a security policy based on the identified firewall rule; and
   determining a policy identifier based on the identified security policy,
      where determining that the device stores or has access to the certificate cache entry comprises:
         determining, by using the policy identifier, that the device stores or has access to the certificate cache entry.

4. The method of claim 3, further comprising:
   receiving a security policy update associated with the identified security policy; and
   updating the policy identifier, based on receiving the security policy update, to create an updated policy identifier,
      the updating of the policy identifier causing one or more cache entries, associated with the policy identifier, to be invalidated,
   the one or more cache entries including the certificate cache entry.

5. The method of claim 1, further comprising:
   determining a server common name (CN) associated with the first certificate chain, a logical system identifier associated with the server device, and virtual routing information associated with the server device,
      where determining that the device stores or has access to the certificate cache entry comprises:
         determining that the device stores or has access to the certificate cache entry based on the server CN, the logical system identifier, and the virtual routing information,
         the certificate cache entry including the second certificate fingerprint.

6. The method of claim 1, where the secure session is a secure sockets layer (SSL) session for which traffic is to be managed using a SSL forward proxy technique.

7. A device, comprising:
   a memory; and
   one or more processors, implemented at least partially in hardware, to:
      receive a message associated with establishing a secure sockets layer (SSL) session,
         the message including a first certificate chain associated with a server device,
         the first certificate chain including a plurality of certificates;

provide information associated with each of the plurality of certificates included in the first certificate chain as an input to a cryptographic hash function;
receive a first certificate fingerprint as an output of the cryptographic hash function;
determine, that the device stores or has access to a certificate cache entry associated with the first certificate chain;
identify, based on determining that the device stores or has access to the certificate cache entry, a second certificate fingerprint associated with the certificate cache entry,
the second certificate fingerprint being based on a second certificate chain that has been validated;
determine whether the first certificate fingerprint matches the second certificate fingerprint; and
provide a stored interdicted certificate chain associated with the second certificate chain or the second certificate fingerprint based on determining that the first certificate fingerprint matches the second certificate fingerprint; or
provide a generated interdicted certificate chain, associated with the first certificate chain, based on determining that the first certificate fingerprint does not match the second certificate fingerprint.

8. The device of claim 7, where the one or more processors, when determining whether the first certificate fingerprint matches the second certificate fingerprint, are to:
determine whether the first certificate fingerprint is identical to the second certificate fingerprint; and
determine whether the first certificate fingerprint matches the second certificate fingerprint based on whether the first certificate fingerprint is identical to the second certificate fingerprint.

9. The device of claim 7,
where the one or more processors are further to:
identify a firewall rule associated with managing traffic for the SSL session;
identify a security policy based on the identified firewall rule; and
determine a policy identifier based on the identified security policy, and
where, when determining that the device stores or has access to the certificate cache entry, the one or more processors are to:
determine, by using the policy identifier, that the device stores or has access to the certificate cache entry.

10. The device of claim 9, where the one or more processors are further to:
receive a security policy update associated with the identified security policy; and
update the policy identifier, based on receiving the security policy update, to create an updated policy identifier,
the updating of the policy identifier causing one or more cache entries, associated with the policy identifier, to be deleted,
the one or more cache entries including the certificate cache entry.

11. The device of claim 7,
where the one or more processors are further to:
determine a server common name (CN) associated with the first certificate chain, a logical system identifier associated with the server device, or virtual routing information associated with the server device, and
where, when determining that the device stores or has access to the certificate cache entry, the one or more processors are to:

determine that the device stores or has access to the certificate cache entry based on one or more of the server CN, the logical system identifier, or the virtual routing information.

12. The device of claim 7, where the SSL session is a session for which traffic is to be managed using a SSL forward proxy technique.

13. A non-transitory computer-readable medium storing instructions, the instructions comprising:
one or more instructions that, when executed by one or more processors of a device, cause the one or more processors to:
receive a message, associated with establishing a secure session, including a first certificate chain associated with a server device,
the first certificate chain including a plurality of certificates;
provide information associated with each of the plurality of certificates included in the first certificate chain as an input to a cryptographic hash function;
receive a first certificate fingerprint as an output of the cryptographic hash function;
determine, that the device stores or has access to a certificate cache entry associated with the first certificate chain;
identify, based on determining that the device stores or has access to the certificate cache entry, a second certificate fingerprint associated with the certificate cache entry,
the second certificate fingerprint being based on a second certificate chain that has been validated;
determine that the first certificate fingerprint does not match the second certificate fingerprint; and
provide a generated interdicted certificate chain associated with the first certificate chain or the second certificate fingerprint based on determining that the first certificate fingerprint does not match the second certificate fingerprint.

14. The non-transitory computer-readable medium of claim 13, where the secure session is a secure sockets layer (SSL) session for which traffic is to be managed using a SSL forward proxy technique.

15. The non-transitory computer-readable medium of claim 13, where the one or more instructions, when executed by the one or more processors, further cause the one or more processors to:
receive a security policy update associated with a security policy associated with the first certificate chain; and
update a policy identifier, based on receiving the security policy update, to create an updated policy identifier,
the updating of the policy identifier causing one or more cache entries, associated with the policy identifier, to be invalidated,
the one or more cache entries including the certificate cache entry.

16. The non-transitory computer-readable medium of claim 13, where the one or more instructions, that cause the one or more processors to determine that the device stores or has access to the certificate cache entry, cause the one or more processors to:
determine, based on at least one of a server common name (CN) associated with the first certificate chain, a logical system identifier associated with the server device, or virtual routing information associated with the server device, that the device stores or has access to the certificate cache entry.

17. The non-transitory computer-readable medium of claim 13, where the one or more instructions, that cause the one or more processors to determine whether the first certificate fingerprint matches the second certificate fingerprint, cause the one or more processors to:
- compare the first certificate fingerprint and the second certificate fingerprint;
- determine whether the first certificate fingerprint is identical to the second certificate fingerprint based on the comparison; and
- determine whether the first certificate fingerprint matches the second certificate fingerprint based on whether the first certificate fingerprint is identical to the second certificate fingerprint.

18. The non-transitory computer-readable medium of claim 13, where the one or more instructions, when executed by the one or more processors, further cause the one or more processors to:
- identify a firewall rule associated with managing traffic for the secure session;
- identify a security policy based on the identified firewall rule; and
- determine a policy identifier based on the identified security policy,
- where, when determining that the device stores or has access to the certificate cache entry, the one or more processors are to:
  - determine, by using the policy identifier, that the device stores or has access to the certificate cache entry.

\* \* \* \* \*